(12) United States Patent
Anchan et al.

(10) Patent No.: US 9,294,956 B2
(45) Date of Patent: Mar. 22, 2016

(54) APPLICATION-SERVER-ASSISTED PREEMPTIVE MULTICAST BEARER ESTABLISHMENT FOR REAL-TIME LOW-LATENCY APPLICATIONS

(71) Applicant: QUALCOMM Incorporated, San Diego, CA (US)

(72) Inventors: Kirankumar Anchan, San Diego, CA (US); Yih-Hao Lin, Santa Clara, CA (US); Mark A. Maggenti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 13/722,127

(22) Filed: Dec. 20, 2012

(65) Prior Publication Data

US 2013/0170357 A1     Jul. 4, 2013

Related U.S. Application Data

(60) Provisional application No. 61/581,576, filed on Dec. 29, 2011.

(51) Int. Cl.
| | |
|---|---|
| H04W 28/02 | (2009.01) |
| H04L 29/06 | (2006.01) |
| H04W 76/00 | (2009.01) |
| H04W 4/06 | (2009.01) |

(52) U.S. Cl.
CPC ....... *H04W 28/0252* (2013.01); *H04L 65/4076* (2013.01); *H04W 4/06* (2013.01); *H04W 76/002* (2013.01)

(58) Field of Classification Search
USPC .......... 370/230, 232, 234, 252, 312, 329, 432
See application file for complete search history.

(56) References Cited

U.S. PATENT DOCUMENTS

| | | | |
|---|---|---|---|
| 6,252,857 B1 * | 6/2001 | Fendick et al. | 370/254 |
| 8,014,783 B2 | 9/2011 | Seidel et al. | |
| 8,175,069 B2 | 5/2012 | Wang et al. | |

(Continued)

FOREIGN PATENT DOCUMENTS

| | | |
|---|---|---|
| WO | 2011081590 A1 | 7/2011 |
| WO | 2012092250 A1 | 7/2012 |

OTHER PUBLICATIONS

3GPP TS 23.246 V10.1.1 (Jun. 2011), 3rd Generation Partnership Project; Technical Specification Group Services and System Aspects; Multimedia Broadcast/Multicast Service (MBMS); Architecture and functional description (Release 10), Sections 8.3.2 and 8.5.2.

(Continued)

*Primary Examiner* — Redentor Pasia
(74) *Attorney, Agent, or Firm* — Michael F. Taveira

(57) ABSTRACT

Methods and systems are disclosed for preemptively establishing a multicast bearer. An embodiment determines whether adding a multicast session to a plurality of multicast bearers will exceed a high bandwidth threshold, requests setup of a new multicast bearer if adding the multicast session will exceed the high bandwidth threshold, and hosts the multicast session on an available one of the plurality of multicast bearers or the new multicast bearer.

26 Claims, 14 Drawing Sheets

(56) References Cited

U.S. PATENT DOCUMENTS

| | | | |
|---|---|---|---|
| 2004/0223513 | A1 | 11/2004 | Meago |
| 2005/0282571 | A1* | 12/2005 | Oprescu-Surcobe et al. ... 455/503 |
| 2006/0133375 | A1* | 6/2006 | Napierala ...................... 370/390 |
| 2007/0177592 | A1* | 8/2007 | Mooney et al. ............... 370/390 |
| 2008/0101376 | A1 | 5/2008 | Do et al. |
| 2008/0112360 | A1 | 5/2008 | Seidel et al. |
| 2009/0147786 | A1* | 6/2009 | Li et al. ......................... 370/390 |
| 2010/0128649 | A1 | 5/2010 | Gonsa et al. |
| 2010/0246394 | A1 | 9/2010 | Omar |
| 2011/0305137 | A1 | 12/2011 | Chu et al. |
| 2012/0170552 | A1* | 7/2012 | Oprescu-Surcobe et al. 370/332 |
| 2012/0230240 | A1* | 9/2012 | Nebat et al. ................... 370/312 |

OTHER PUBLICATIONS

Alcatel-Lucent: "eMBMS Architecture: Alternatives for Allocation of MCE Function and Requirements on O&M", 3GPP Draft; R3-071240, 3rd Generation Partnership Project (3GPP), Mobile Competence Centre ; 650, Route DesLucioles; F-06921 Sophia-Antipolis Cedex; France, vol. TSG CN, No. Sophia; Jun. 13-14, 2007, XP050020533, [retrieved on Jun. 6, 2006].
Co-pending U.S. Appl. No. 13/483,679, filed May 30, 2012.
International Search Report and Written Opinion—PCT/US2012/072008—ISA/EPO—Mar. 15, 2013.

\* cited by examiner

APPLICATION-SERVER-ASSISTED PREEMPTIVE MULTICAST BEARER ESTABLISHMENT FOR REAL-TIME LOW-LATENCY APPLICATIONS

CLAIM OF PRIORITY UNDER 35 U.S.C. §119

The present Application for Patent claims priority to Provisional Application No. 61/581,576, entitled "APPLICATION-SERVER-ASSISTED PREEMPTIVE MULTICAST BEARER ESTABLISHMENT FOR REAL-TIME LOW-LATENCY APPLICATIONS," filed Dec. 29, 2011, and assigned to the assignee hereof and hereby expressly incorporated by reference herein.

FIELD OF DISCLOSURE

The present disclosure relates generally to communication, and more specifically to techniques for supporting group communications on broadcast and multicast services in a cellular communication system.

BACKGROUND

A cellular communication system can support bi-directional communication for multiple users by sharing the available system resources. Cellular systems are different from broadcast systems that can mainly or only support unidirectional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users, e.g., news broadcast. A multicast service is a service that may be received by a group of users, e.g., a subscription video service. A unicast service is a service intended for a specific user, e.g., voice call. Group communications can be implemented using either unicast, broadcast, multicast or a combination of each. As the group becomes larger it is generally more efficient to use multicast services. However, for group communication services that require low latency and a short time to establish the group communication, the setup time of conventional multicast channels can be a detriment to system performance.

SUMMARY

The disclosure is directed to preemptively establishing a multicast bearer. An embodiment determines whether adding a multicast session to a plurality of multicast bearers will exceed a high bandwidth threshold, requests setup of a new multicast bearer if adding the multicast session will exceed the high bandwidth threshold, and hosts the multicast session on an available one of the plurality of multicast bearers or the new multicast bearer.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
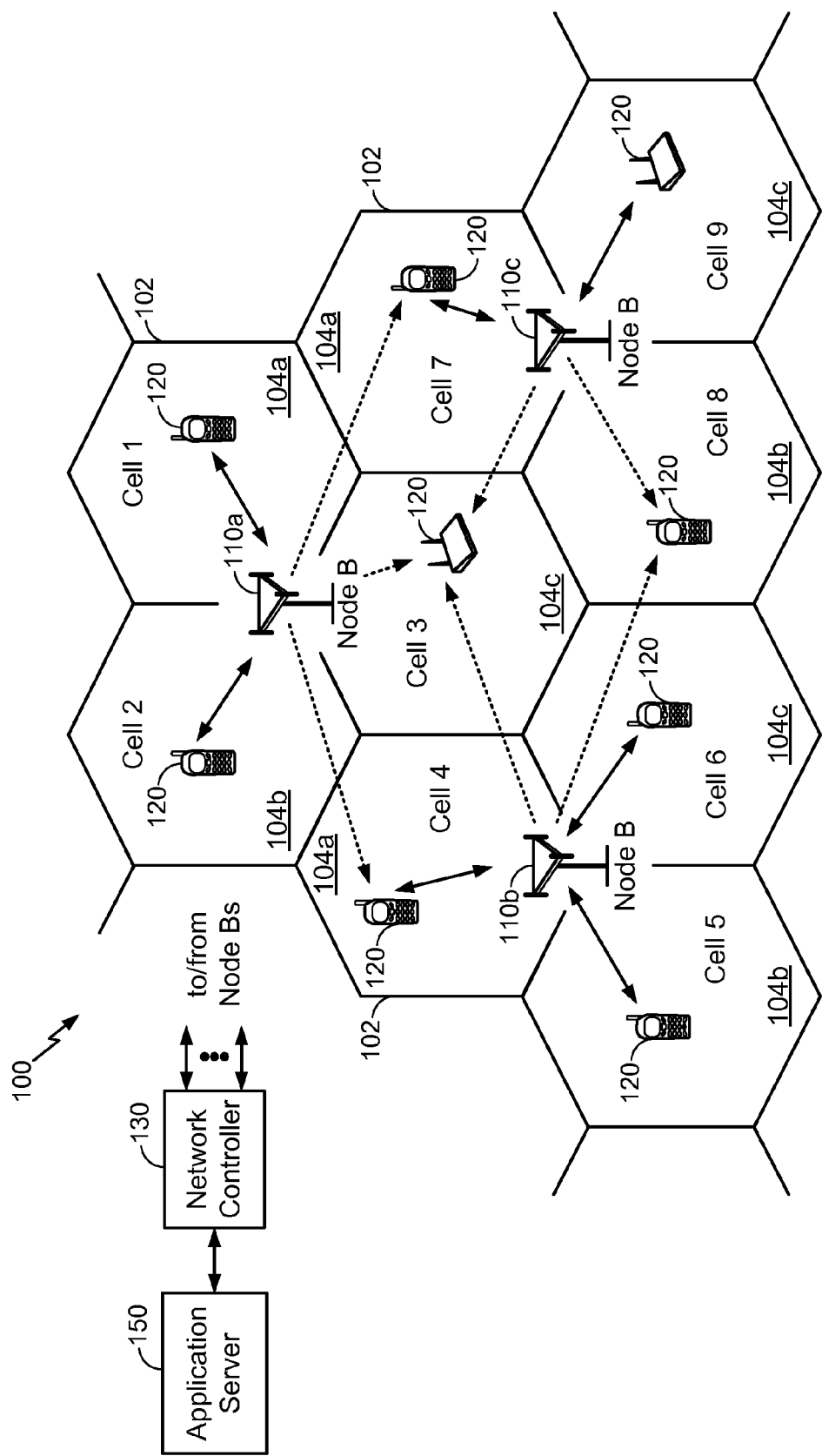
FIG. 1 illustrates a wireless communication system.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. Further, as used herein the term group communication, push-to-talk, or similar variations are meant to refer to a server arbitrated service between two or more devices.

The terminology used herein is for the purpose of describing particular embodiments only and is not intended to be limiting of embodiments of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The techniques described herein may be used for various cellular communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

FIG. 1 shows a cellular communication system 100, which may be an LTE system. System 100 may include a number of Node Bs and other network entities. For simplicity, only three Node Bs 110a, 110b and 110c are shown in FIG. 1. A Node B may be a fixed station used for communicating with the user equipments (UEs) and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area of a base station and/or a base station subsystem serving this coverage area. For clarity, 3GPP concept of a cell is used in the description below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow a UE to receive coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE. A dashed line with a single arrow indicates a UE receiving a downlink signal from a Node B, e.g., for broadcast and/or multicast services. The terms "UE" and "user" are used interchangeably herein.

Network controller 130 may couple to multiple Node Bs to provide coordination and control for the Node Bs under its control, and to route data for terminals served by these Node Bs. Access network 100 may also include other network entities not shown in FIG. 1. Further, as illustrated network controller may be operably coupled to an application server 150 to provide group communication services to the various UEs 120 through access network 100. It will be appreciated that there can be many other network and system entities that can be used to facilitate communications between the UEs and servers and information outside of the access network. Accordingly, the various embodiments disclosed herein are not limited to the specific arrangement or elements detailed in the various figures.

Figure 2:
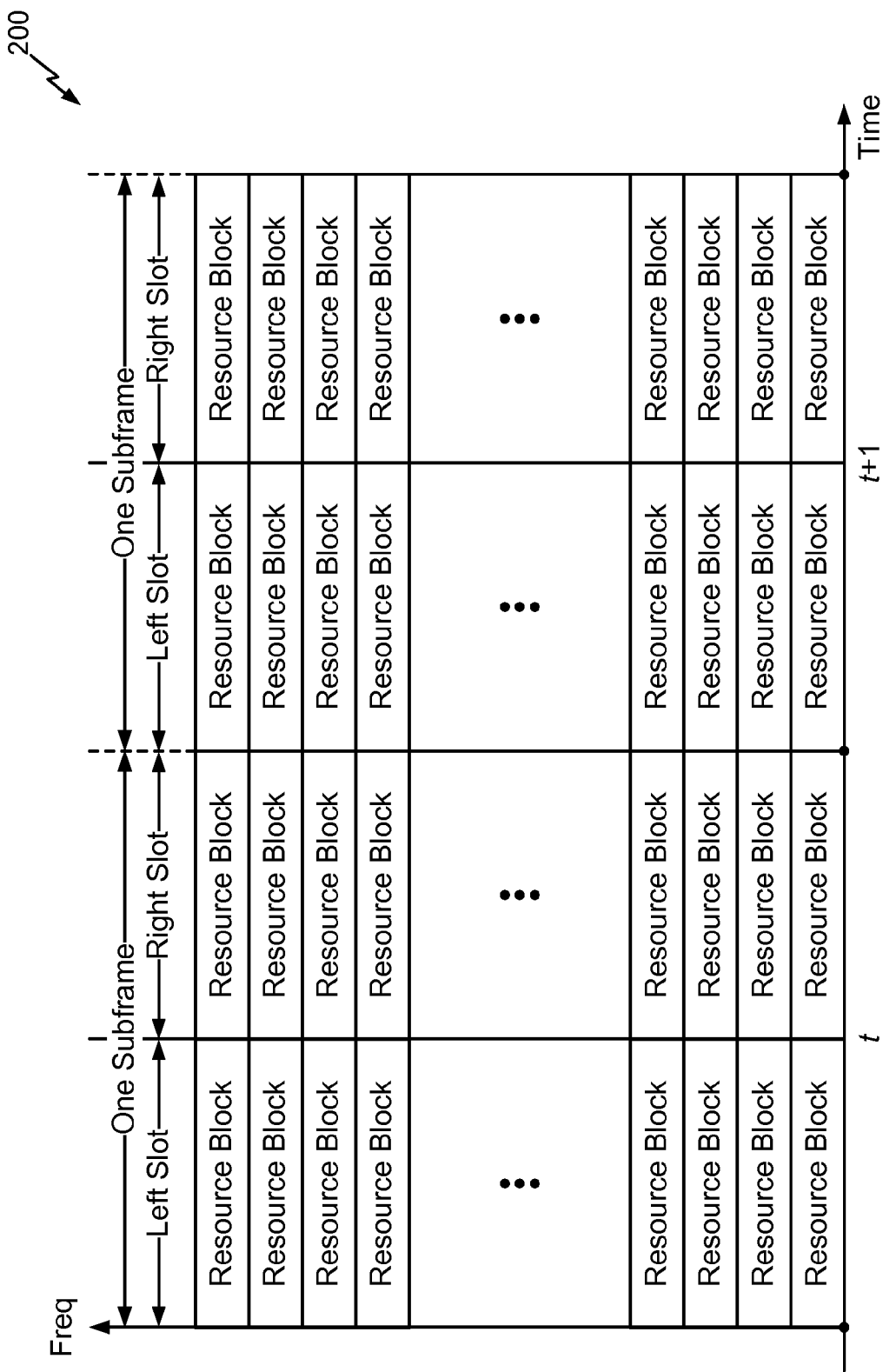
FIG. 2 illustrates an example transmission structure.

FIG. 2 shows an example transmission structure 200 that may be used for the downlink in system 100. The transmission timeline may be partitioned into units of radio frames. Each radio frame may have a predetermined duration (e.g., 10 milliseconds (ms)) and may be partitioned into 10 sub frames. Each sub frame may include two slots, and each slot may include a fixed or configurable number of symbol periods, e.g., six or seven symbol periods.

The system bandwidth may be partitioned into multiple (K) subcarriers with orthogonal frequency division multiplexing (OFDM). The available time frequency resources may be divided into resource blocks. Each resource block may include Q subcarriers in one slot, where Q may be equal to 12 or some other value. The available resource blocks may be used to send data, overhead information, pilot, etc.

The system may support evolved multimedia broadcast/multicast services (eMBMS or E-MBMS) for multiple UEs as well as unicast services for individual UEs. A service for eMBMS may be referred to as an eMBMS service or flow and may be a broadcast service/flow or a multicast service/flow.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels (denoted as "L"), transport channels (denoted as "T"), and physical channels (denoted as "P") used in LTE and provides a short description for each channel.

TABLE 1

| Name | Channel | Type | Description |
|---|---|---|---|
| Broadcast Control Channel | BCCH | L | Carry system information |
| Broadcast Channel | BCH | T | Carry master system Information |
| eMBMS Traffic Channel | MTCH | L | Carry configuration information for eMBMS services. |
| Multicast Channel | MCH | T | Carry the MTCH and MCCH |

TABLE 1-continued

| Name | Channel | Type | Description |
| --- | --- | --- | --- |
| Downlink Shared Channel | DL-SCH | T | Carry the MTCH and other logical channels |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH |
| Physical Downlink Control Channel | PDCCH | P | Carry control information for the DL-SCH |

As shown in Table 1, different types of overhead information may be sent on different channels. Table 2 lists some types of overhead information and provides a short description for each type. Table 2 also gives the channel(s) on which each type of overhead information may be sent, in accordance with one design.

TABLE 2

| Overhead Information | Channel | Description |
| --- | --- | --- |
| System Information | BCCH | Information pertinent for communicating with and/or receiving data from the system. |
| Configuration Information | MCCH | Information used to receive the Information services, e.g., MBSFN Area Configuration, which contains PMCH configurations, Service ID, Session ID, etc. |
| Control Information | PDCCH | Information used to receive Information transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for eMBMS, which may include a multi-cell mode and a single-cell mode. The multi-cell mode may have the following characteristics:

Content for broadcast or multicast services can be transmitted synchronously across multiple cells.

Radio resources for broadcast and multicast services are allocated by an MBMS Coordinating Entity (MCE), which may be logically located above the Node Bs.

Content for broadcast and multicast services is mapped on the MCH at a Node B.

Time division multiplexing (e.g., at sub frame level) of data for broadcast, multicast, and unicast services.

The single-cell mode may have the following characteristics:

Each cell transmits content for broadcast and multicast services without synchronization with other cells.

Radio resources for broadcast and multicast services are allocated by the Node B.

Content for broadcast and multicast services is mapped on the DL-SCH.

Data for broadcast, multicast, and unicast services may be multiplexed in any manner allowed by the structure of the DL-SCH.

In general, eMBMS services may be supported with the multi-cell mode, the single-cell mode, and/or other modes. The multi-cell mode may be used for eMBMS multicast/broadcast single frequency network (MBSFN) transmission, which may allow a UE to combine signals received from multiple cells in order to improve reception performance.

Figure 3:
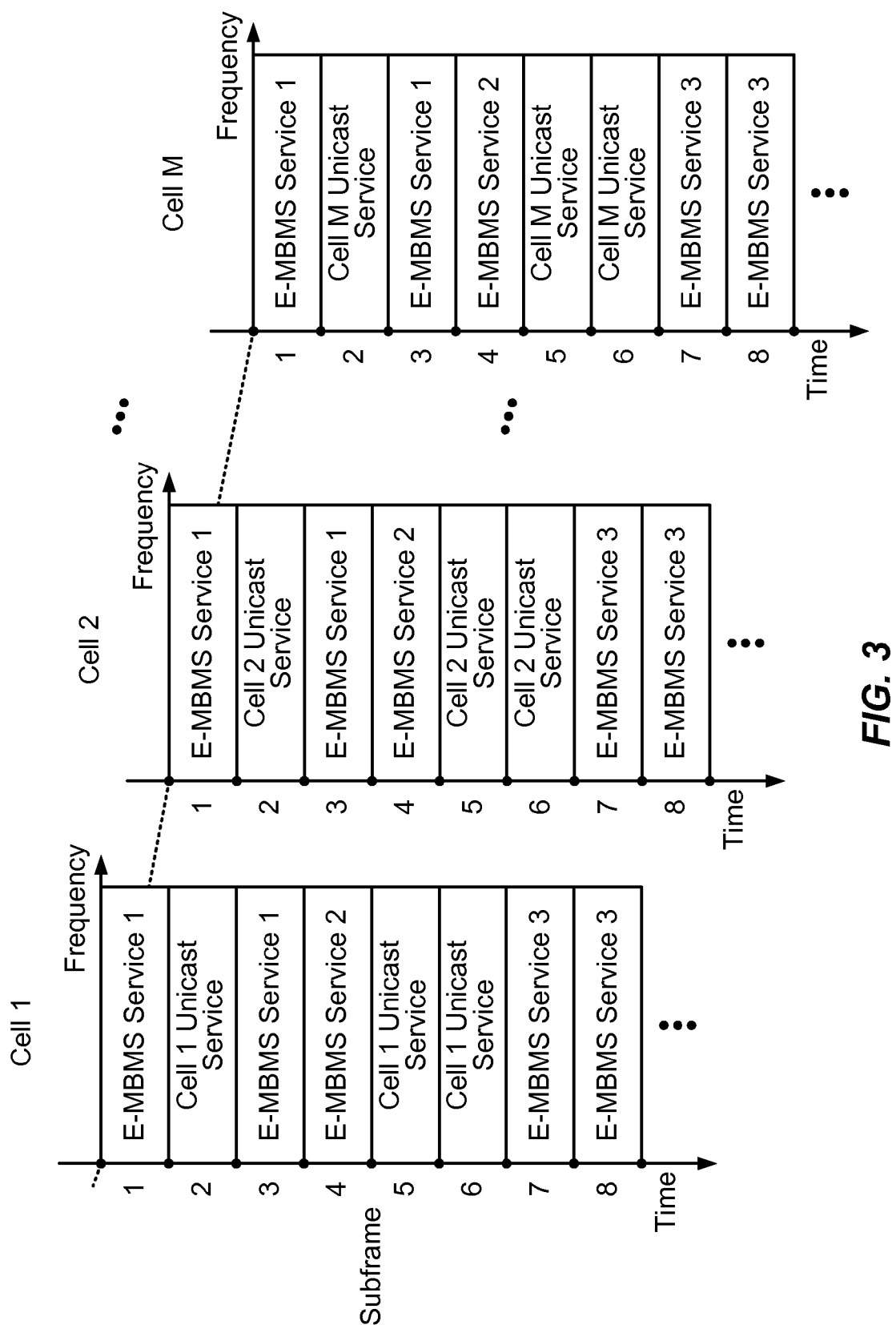
FIG. 3 illustrates example transmissions of different services in a multi-cell mode.

FIG. 3 shows example transmissions of eMBMS and unicast services by M cells 1 through M in the multi-cell mode, where M may be any integer value. For each cell, the horizontal axis may represent time, and the vertical axis may represent frequency. In one design of eMBMS, which is assumed for much of the description below, the transmission time line for each cell may be partitioned into time units of sub frames. In other designs of eMBMS, the transmission time line for each cell may be partitioned into time units of other durations. In general, a time unit may correspond to a sub frame, a slot, a symbol period, multiple symbol periods, multiple slots, multiple sub frames, etc.

In the example shown in FIG. 3, the M cells transmit three eMBMS services 1, 2 and 3. All M cells transmit eMBMS service 1 in sub frames 1 and 3, eMBMS service 2 in sub frame 4, and eMBMS service 3 in sub frames 7 and 8. The M cells transmit the same content for each of the three eMBMS services. Each cell may transmit its own unicast service in sub frames 2, 5 and 6. The M cells may transmit different contents for their unicast services.

Figure 4:
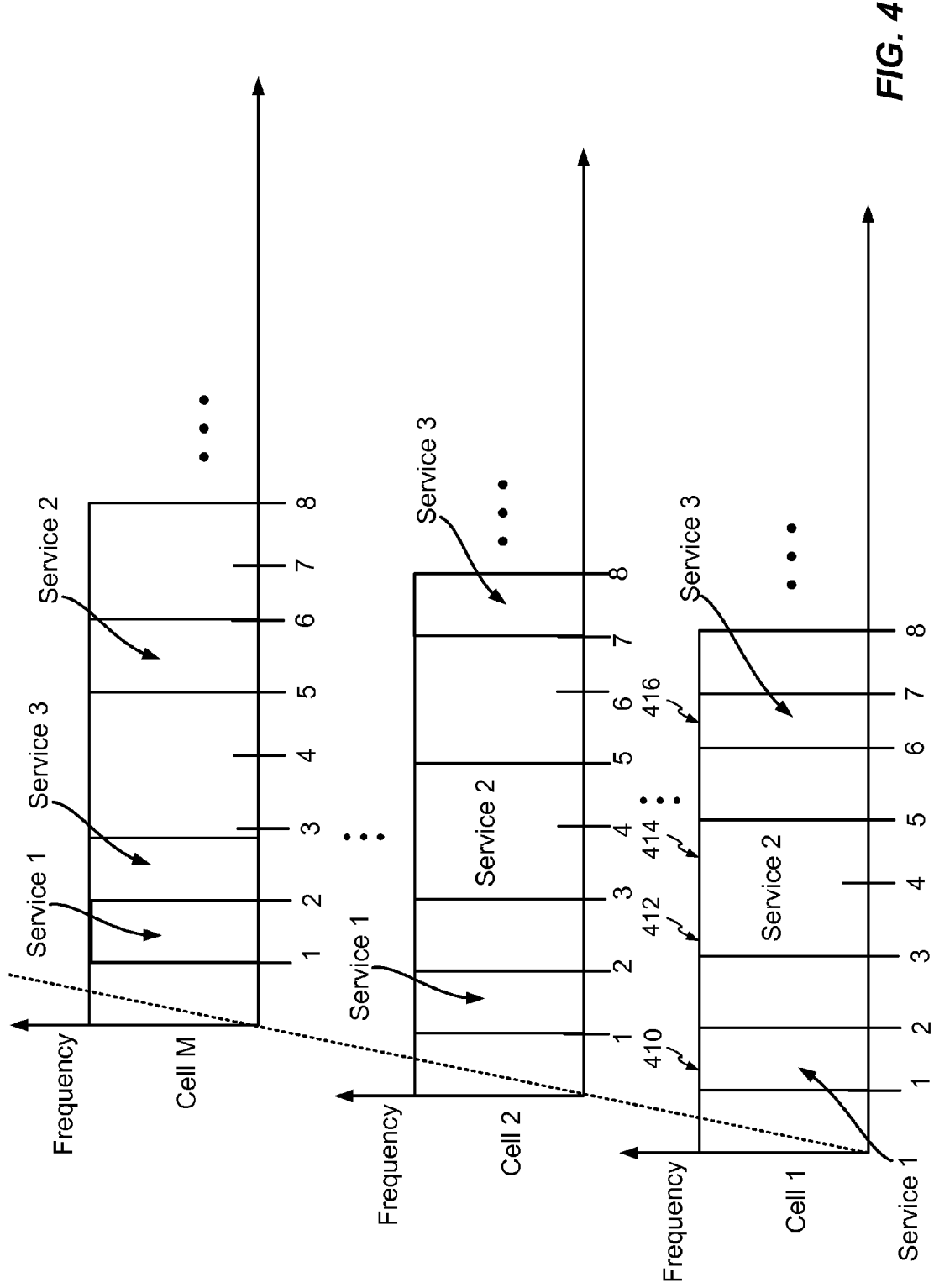
FIG. 4 illustrates example transmissions of different services in a single-cell mode.

FIG. 4 shows example transmissions of eMBMS and unicast services by M cells in the single-cell mode. For each cell, the horizontal axis may represent time, and the vertical axis may represent frequency. In the example shown in FIG. 4, the M cells transmit three eMBMS services 1, 2 and 3. Cell 1 transmits eMBMS service 1 in one time frequency block 410, eMBMS service 2 in a time frequency blocks 412 and 414, and eMBMS service 3 in one time frequency blocks 416. Similarly other cells transmit services 1, 2 and 3 as shown in the FIG. 4.

In general, an eMBMS service may be sent in any number of time frequency blocks. The number of sub frames may be dependent on the amount of data to send and possibly other factors. The M cells may transmit the three eMBMS services 1, 2 and 3 in time frequency blocks that may not be aligned in time and frequency, as shown in FIG. 4. Furthermore, the M cells may transmit the same or different contents for the three eMBMS services. Each cell may transmit its own unicast service in remaining time frequency resources not used for the three eMBMS services. The M cells may transmit different contents for their unicast services.

FIGS. 3 and 4 show example designs of transmitting eMBMS services in the multi-cell mode and the single-cell mode. eMBMS services may also be transmitted in other manners in the multi-cell and single-cell modes, e.g., using time division multiplexing (TDM).

As noted in the foregoing, eMBMS services can be used to distribute multicast data to groups and could be useful in group communication systems (e.g., Push-to-Talk (PTT) calls). Conventional applications on eMBMS have a separate service announcement/discovery mechanism. Further, communications on pre-established eMBMS flows are always on even on the air interface. Power saving optimization must be applied to put the UE to sleep when a call/communication is not in progress. This is typically achieved by using out of band service announcements on unicast or multicast user plane data. Alternatively application layer paging channel like mechanism may be used. Since the application layer paging mechanism has to remain active, it consumes bandwidth on the multicast sub-frame which could be idle in the absence of the paging mechanism. Additionally, since the multicast sub-frame will be active while using the application layer paging, the remainder of the resource blocks within the sub frame cannot be used for unicast traffic. Thus the total Mhz bandwidth will be consumed for the sub frame for instances when application layer paging is scheduled without any other data.

Figure 5A:
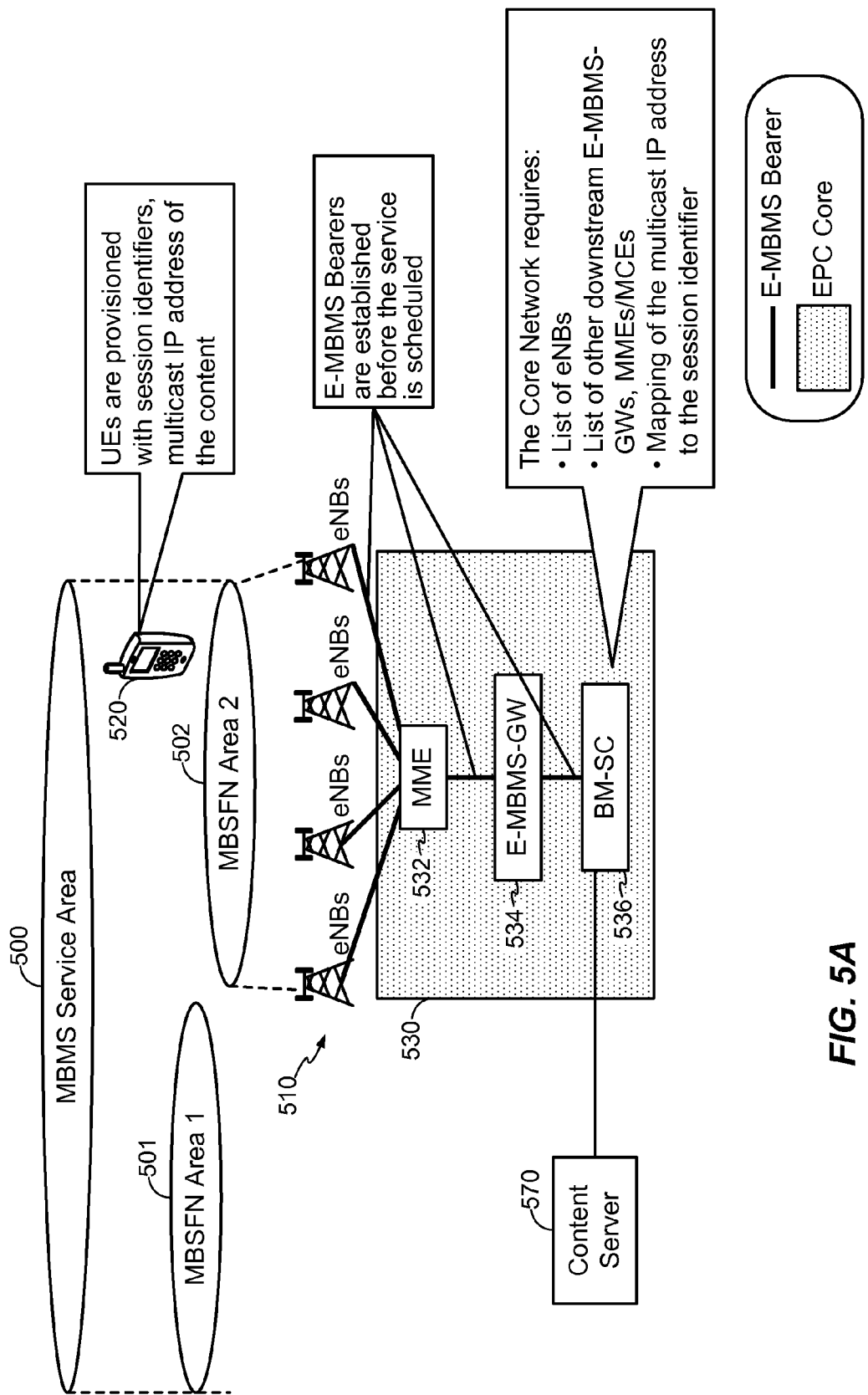
FIGS. 5A and 5B illustrate additional wireless communication systems that can support broadcast/multicast services.

FIG. 5A is another illustration of a wireless network that can implement evolved multimedia broadcast/multicast services (eMBMS) or MBMS services, which are used interchangeably herein. An MBMS service area 500 can include multiple MBSFN areas (e.g. MBSFN area 1, 501 and MBSFN area 2, 502). Each MBSFN area can be supported by one or more eNode Bs 510, which are coupled to a core network 530. Core network 530 can include various elements (e.g., MME 532, eMBMS gateway 534, and broadcast multicast service center (BM-SC) 536 to facilitate controlling and distributing the content from content provider 570 (which may include an application server, etc.) to the MBMS service area 500. The core network 530 may require a list of eNode Bs within the network, list of other downstream eMBMS-GWs 534, and (Mobility Management Entity) MMEs/MCEs 532, and a mapping of the multicast IP address to the session identifier. UE 520 within the network can be provisioned with session identifiers and multicast IP address of the content sent to it. Typically an MME is a key control node for the LTE access network. It is responsible for idle mode UE tracking and paging procedure including retransmissions. It is involved in the bearer activation/deactivation process and is also responsible for choosing the SGW for a UE at the initial attach and at time of intra-LTE handover involving core network 530 node relocation and the MME is also responsible for authenticating the user. The MME 532 can also check the authorization of the UE to camp on the service provider's Public Land Mobile Network (PLMN) and enforces UE roaming restrictions. The MME 532 is the termination point in the network for ciphering/integrity protection for Non Access Stratum (NAS) signaling and handles the security key management. The MME also provides the control plane function for mobility between LTE and 2G/3G access networks with S3 interface terminating at the MME.

Figure 5B:
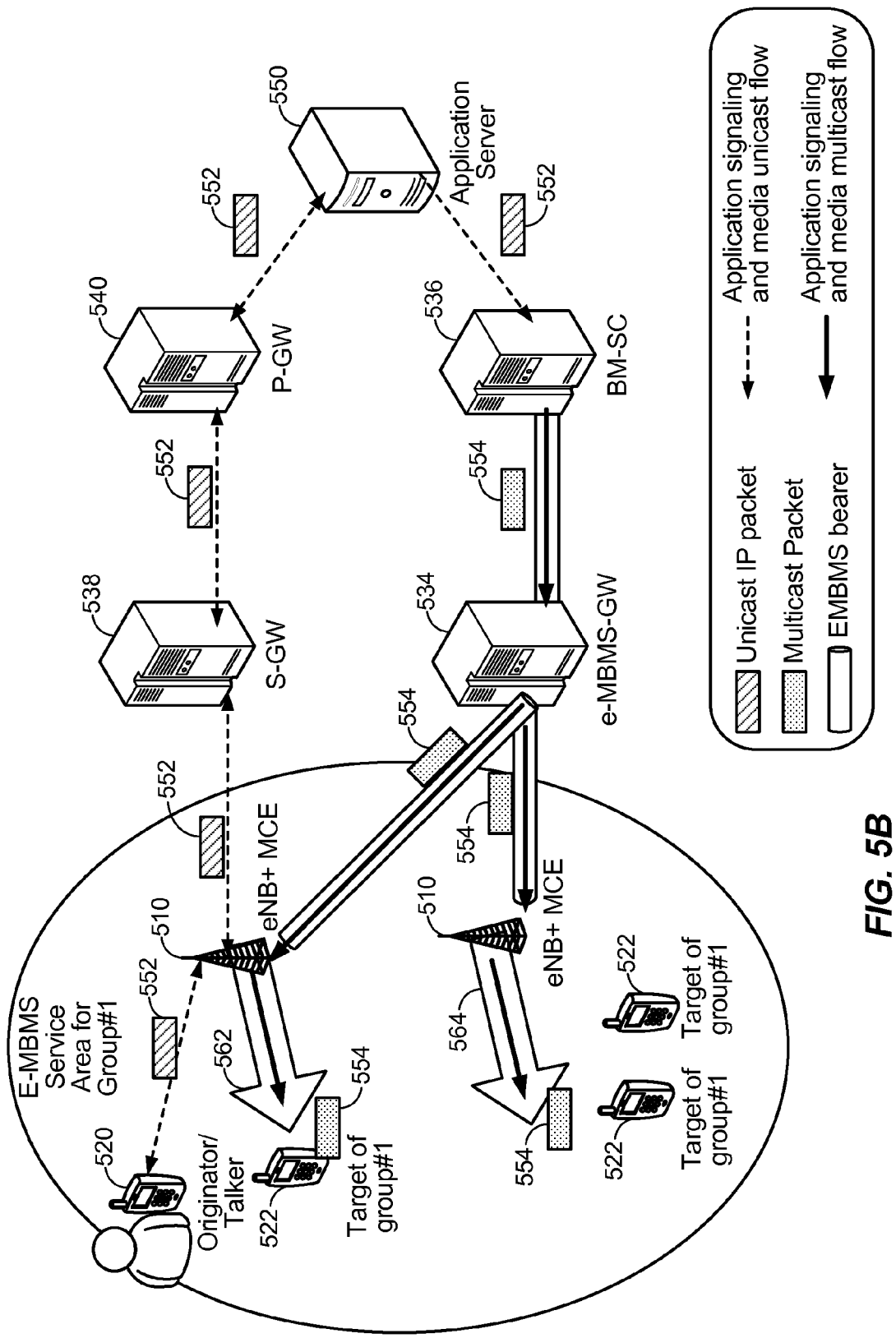

FIG. 5B is another illustration of a wireless network that can implement multimedia broadcast/multicast services (MBMS) as disclosed herein. In the illustrated network, an application server 550 (e.g., PTT server) can serve as the content server. The application server 550 can communicate media in unicast packets 552 to the network core (including the packet data network gateway (P-GW) 540 and serving gateway (S-GW) 538) where the content can be maintained in a unicast configuration and transmitted as unicast packets to a given UE (e.g., originator/talker 520) or can be converted through the BM-SC 536 to multicast packets 554, which can then be transported target UE's 522. For example, a PTT call can be initiated by UE 520 by communicating with application server 550 via unicast packets 552 over a unicast channel. It will be noted that for the call originator/call talker both the application signaling and media are communicated via the unicast channel on the uplink or the reverse link. The application server 550 can then generate a call announce/call setup request and communicate these to the target UEs 522. The communication can be communicated to the target UEs 522 via multicast packets 554 over a multicast flow, as illustrated in this particular example. Further, it will be appreciated in this example, that both the application signaling and media can be communicated over the multicast flow in the downlink or the forward link. Unlike conventional systems, having both the application signaling and the media in the multicast flow, avoids the need of having a separate unicast channel for the application signaling. However, to allow for application signaling over the multicast flow of the illustrated system, an evolved packet system (EPS) bearer will be established (and persistently on) between the BM-SC 536, EMBS GW 534, eNBs 510 and target UEs 522.

In accordance with various embodiments disclosed herein some of the downlink channels related to eMBMS will be further discussed, which include.

MCCH: Multicast Control Channel;
MTCH: Multicast Traffic Channel;
MCH: Multicast Channel; and
PMCH: Physical Multicast Channel.

It will be appreciated that multiplexing of eMBMS and unicast flows are realized in the time domain only. The MCH is transmitted over MBSFN in specific sub frames on physical layer. MCH is a downlink only channel. A single transport block is used per sub frame. Different services (MTCHs) can be multiplexed in this transport block, as will be illustrated in relation to FIG. 6.

To achieve low latency and reduce control signaling, one eMBMS flow (562, 564) can be activated for each service area. Depending on the data rate, multiple multicast flows can be multiplexed on a single slot. PTT UEs (targets) can ignore and "sleep" between scheduled sub frames and reduce power consumption when no unicast data is scheduled for the UE. The MBSFN sub frame can be shared by groups in the same MBSFN service area. MAC layer signaling can be leveraged to "wake-up" the application layer (e.g., PTT application) for the target UEs.

Embodiments can use two broadcast streams, each a separate eMBMS flow over an LTE broadcast flow, with its own application level broadcast stream and its own (multicast IP address) for each defined broadcast region 502, 501 (e.g., a subset of sectors within the network). Although illustrated as separate regions, it will be appreciated that the broadcast areas 502, 501 may overlap.

In LTE, the control and data traffic for multicast is delivered over MCCH and MTCH, respectively. The Medium Access Control Protocol Data Units (MAC PDUs) for the UEs indicate the mapping of the MTCH and the location of the a particular MTCH within a sub frame. An MCH Scheduling Information (MSI) MAC control element is included in the first subframe allocated to the MCH within the MCH scheduling period to indicate the position of each MTCH and unused subframes on the MCH. For eMBMS user data, which is carried by the MTCH logical channel, MCH scheduling information (MSI) periodically provides at lower layers (e.g., MAC layer information) the information on decoding the MTCH. The MSI scheduling can be configured and according to this embodiment is scheduled prior to MTCH sub-frame interval.

Figure 6:
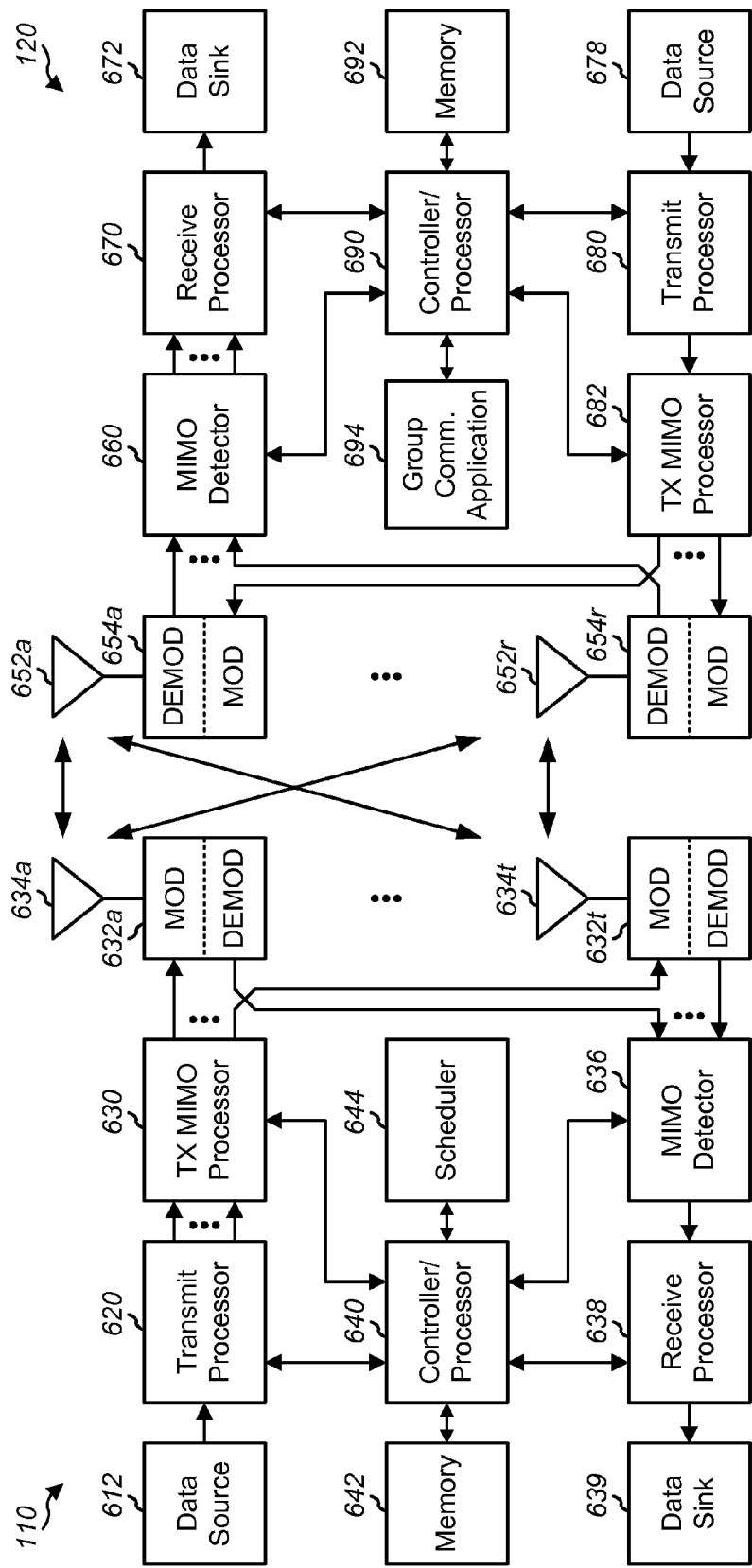
FIG. 6 illustrates a block diagram of a portion of a wireless communication system that can support broadcast/multicast services.

FIG. 6 illustrates a block diagram of a design of an eNode B 110 and UE 120, which may be one of the eNode Bs and one of the UEs discussed herein in relation to the various embodiments. In this design, Node B 110 is equipped with T antennas 634a through 634t, and UE 120 is equipped with R antennas 652a through 652r, where in general T is greater than or equal to 1 and R is greater than or equal to 1.

At Node B 110, a transmit processor 620 may receive data for unicast services and data for broadcast and/or multicast services from a data source 612 (e.g., directly or indirectly from application server 150). Transmit processor 620 may process the data for each service to obtain data symbols. Transmit processor 620 may also receive scheduling information, configuration information, control information, system information and/or other overhead information from a controller/processor 640 and/or a scheduler 644. Transmit processor 620 may process the received overhead information and provide overhead symbols. A transmit (TX) multiple-input multiple-output (MIMO) processor 630 may multiplex the data and overhead symbols with pilot symbols, process (e.g., precode) the multiplexed symbols, and provide T output symbol streams to T modulators (MOD) 632a through 632t. Each modulator 632 may process a respective output symbol stream (e.g., for OFDM) to obtain an output sample stream. Each modulator 632 may further process (e.g., convert to analog, amplify, filter, and upconvert) the output sample stream to obtain a downlink signal. T downlink signals from modulators 632a through 632t may be transmitted via T antennas 634a through 634t, respectively.

At UE 120, antennas 652a through 652r may receive the downlink signals from Node B 110 and provide received signals to demodulators (DEMOD) 654a through 654r, respectively. Each demodulator 654 may condition (e.g., filter, amplify, downconvert, and digitize) a respective received signal to obtain received samples and may further process the received samples (e.g., for OFDM) to obtain received symbols. A MIMO detector 660 may receive and process the received symbols from all R demodulators 654a through 654r and provide detected symbols. A receive processor 670 may process the detected symbols, provide decoded data for UE 120 and/or desired services to a data sink 672, and provide decoded overhead information to a controller/processor 690. In general, the processing by MIMO detector 660 and receive processor 670 is complementary to the processing by TX MIMO processor 630 and transmit processor 620 at Node B 110.

On the uplink, at UE 120, data from a data source 678 and overhead information from a controller/processor 690 may be processed by a transmit processor 680, further processed by a TX MIMO processor 682 (if applicable), conditioned by modulators 654a through 654r, and transmitted via antennas 652a through 652r. At Node B 110, the uplink signals from UE 120 may be received by antennas 634, conditioned by demodulators 632, detected by a MIMO detector 636, and processed by a receive processor 638 to obtain the data and overhead information transmitted by UE 120.

Controllers/processors 640 and 690 may direct the operation at Node B 110 and UE 120, respectively. Scheduler 644 may schedule UEs for downlink and/or uplink transmission, schedule transmission of broadcast and multicast services, and provide assignments of radio resources for the scheduled UEs and services. Controller/processor 640 and/or scheduler 644 may generate scheduling information and/or other overhead information for the broadcast and multicast services.

Controller/processor 690 may implement processes for the techniques described herein. Memories 642 and 692 may store data and program codes for Node B 110 and UE 120, respectively. Accordingly, group communications in the eMBMS environment can be accomplished in accordance with the various embodiments disclosed herein, while still remaining compliant with the existing standards.

Figure 7:
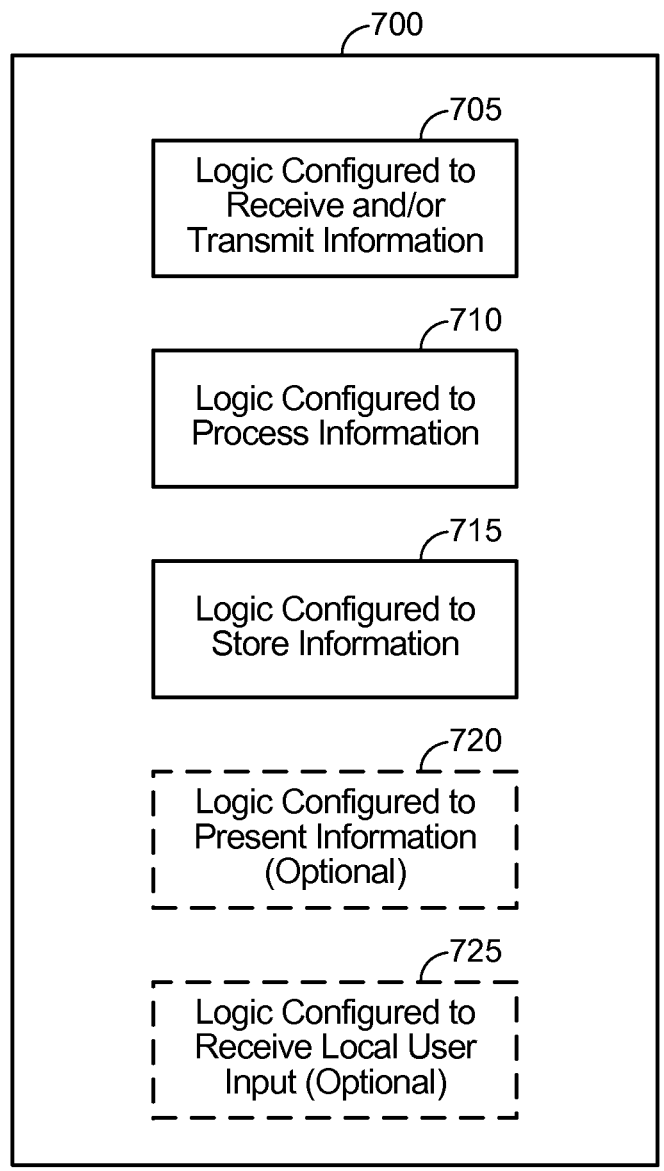
FIG. 7 illustrates a communication device that includes logic configured to receive and/or transmit information.

FIG. 7 illustrates a communication device 700 that includes logic configured to perform functionality. The communication device 700 can correspond to any of the above-noted communication devices, including but not limited to Node Bs 110 or 510, UEs 120 or 520, the application server 150, the network controller 130, the BM-SC 536, the content server 570, MME 532, eMBMS-GW 534, etc. Thus, communication device 700 can correspond to any electronic device that is configured to communicate with (or facilitate communication with) one or more other entities over a network.

Referring to FIG. 7, the communication device 700 includes logic configured to receive and/or transmit information 705. In an example, if the communication device 700 corresponds to a wireless communications device (e.g., UE 120, Node B 110, etc.), the logic configured to receive and/or transmit information 705 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 705 can correspond to a wired communications interface (e.g., a serial connection, a USB or Firewire connection, an Ethernet connection through which the Internet 175 can be accessed, etc.). Thus, if the communication device 700 corresponds to some type of network-based server (e.g., the application server 150, the network controller 130, the BM-SC 536, the content server 570, MME 532, eMBMS-GW 534, etc.), the logic configured to receive and/or transmit information 705 can correspond to an Ethernet card, in an example, that connects the network-based server to other communication entities via an Ethernet protocol. In a further example, the logic configured to receive and/or transmit information 705 can include sensory or measurement hardware by which the communication device 700 can monitor its local environment (e.g., an accelerometer, a temperature sensor, a light sensor, an antenna for monitoring local RF signals, etc.). The logic configured to receive and/or transmit information 705 can also include software that, when executed, permits the associated hardware of the logic configured to receive and/or transmit information 705 to perform its reception and/or transmission function(s). However, the logic configured to receive and/or transmit information 705 does not correspond to software alone, and the logic configured to receive and/or transmit information 705 relies at least in part upon hardware to achieve its functionality.

Referring to FIG. 7, the communication device 700 further includes logic configured to process information 710. In an example, the logic configured to process information 710 can include at least a processor. Example implementations of the type of processing that can be performed by the logic configured to process information 710 includes but is not limited to performing determinations, establishing connections, making selections between different information options, performing evaluations related to data, interacting with sensors coupled to the communication device 700 to perform measurement operations, converting information from one format to another (e.g., between different protocols such as .wmv to .avi, etc.), and so on. For example, the processor included in the logic configured to process information 710 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 710 can also include software that, when executed, permits the associated hardware of the logic configured to process information 710 to perform its processing function(s). However, the logic configured to process information 710 does not correspond to software alone, and the logic configured to process information 710 relies at least in part upon hardware to achieve its functionality.

Referring to FIG. 7, the communication device 700 further includes logic configured to store information 715. In an example, the logic configured to store information 715 can include at least a non-transitory memory and associated hardware (e.g., a memory controller, etc.). For example, the non-transitory memory included in the logic configured to store information 715 can correspond to random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. The logic configured to store information 715 can also include software that, when executed, permits the associated hardware of the logic configured to store information 715 to perform its storage function(s). However, the logic configured to store information 715 does not correspond to software alone, and the logic configured to store information 715 relies at least in part upon hardware to achieve its functionality.

Referring to FIG. 7, the communication device 700 further optionally includes logic configured to present information 720. In an example, the logic configured to display information 720 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 700. For example, if the communication device 700 corresponds to UE 120 or 520, the logic configured to present information 720 can include a display screen and an audio output device (e.g., speakers). In a further example, the logic configured to present information 720 can be omitted for certain communication devices, such as network communication devices that do not have a local user (e.g., network switches or routers, remote servers, etc.). The logic configured to present information 720 can also include software that, when executed, permits the associated hardware of the logic configured to present information 720 to perform its presentation function(s). However, the logic configured to present information 720 does not correspond to software alone, and the logic configured to present information 720 relies at least in part upon hardware to achieve its functionality.

Referring to FIG. 7, the communication device 700 further optionally includes logic configured to receive local user input 725. In an example, the logic configured to receive local user input 725 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 700. For example, if the communication device 700 corresponds to UE 120 or 520, the logic configured to receive local user input 725 can include a display screen (if implemented a touch-screen), a keypad, etc. In a further example, the logic configured to receive local user input 725 can be omitted for certain communication devices, such as network communication devices that do not have a local user (e.g., network switches or routers, remote servers, etc.). The logic configured to receive local user input 725 can also include software that, when executed, permits the associated hardware of the logic configured to receive local user input 725 to perform its input reception function(s). However, the logic configured to receive local user input 725 does not correspond to software alone, and the logic configured to receive local user input 725 relies at least in part upon hardware to achieve its functionality.

Referring to FIG. 7, while the configured logics of 705 through 725 are shown as separate or distinct blocks in FIG. 7, it will be appreciated that the hardware and/or software by which the respective configured logic performs its functionality can overlap in part. For example, any software used to facilitate the functionality of the configured logics of 705 through 725 can be stored in the non-transitory memory associated with the logic configured to store information 715, such that the configured logics of 705 through 725 each performs their functionality (i.e., in this case, software execution) based in part upon the operation of software stored by the logic configured to store information 705. Likewise, hardware that is directly associated with one of the configured logics can be borrowed or used by other configured logics from time to time. For example, the processor of the logic configured to process information 710 can format data into an appropriate format before being transmitted by the logic configured to receive and/or transmit information 705, such that the logic configured to receive and/or transmit information 705 performs its functionality (i.e., in this case, transmission of data) based in part upon the operation of hardware (i.e., the processor) associated with the logic configured to process information 710. Further, the configured logics or "logic configured to" of 705 through 725 are not limited to specific logic gates or elements, but generally refer to the ability to perform the functionality describe herein (either via hardware or a combination of hardware and software). Thus, the configured logics or "logic configured to" of 705 through 725 are not necessarily implemented as logic gates or logic elements despite sharing the word "logic." Other interactions or cooperation between the configured logics 705 through 725 will become clear to one of ordinary skill in the art from a review of the embodiments described below in more detail.

For group communication services that require low latency and a short time to establish the group communication, the setup time of conventional multicast channels can be detrimental to system performance. A conventional eMBMS system, for example, only allows static or semi-static bearer setup. For low latency applications, if the bearers are setup during the call initiation, the call latency will be unacceptable. To avoid this, the bearers may be setup from the time the service is operational based on statistical traffic patterns. Further, MCCH propagation issues prevent on-demand bearer establishment for low latency applications.

Typically, bearer sizing is performed to accommodate high traffic periods, but since the eMBMS bearers are always held in one state, even during periods of inactivity, these bearers are underutilized. Moreover, the bearers take away the useable network capacity that could be used for unicast users.

Figure 8:
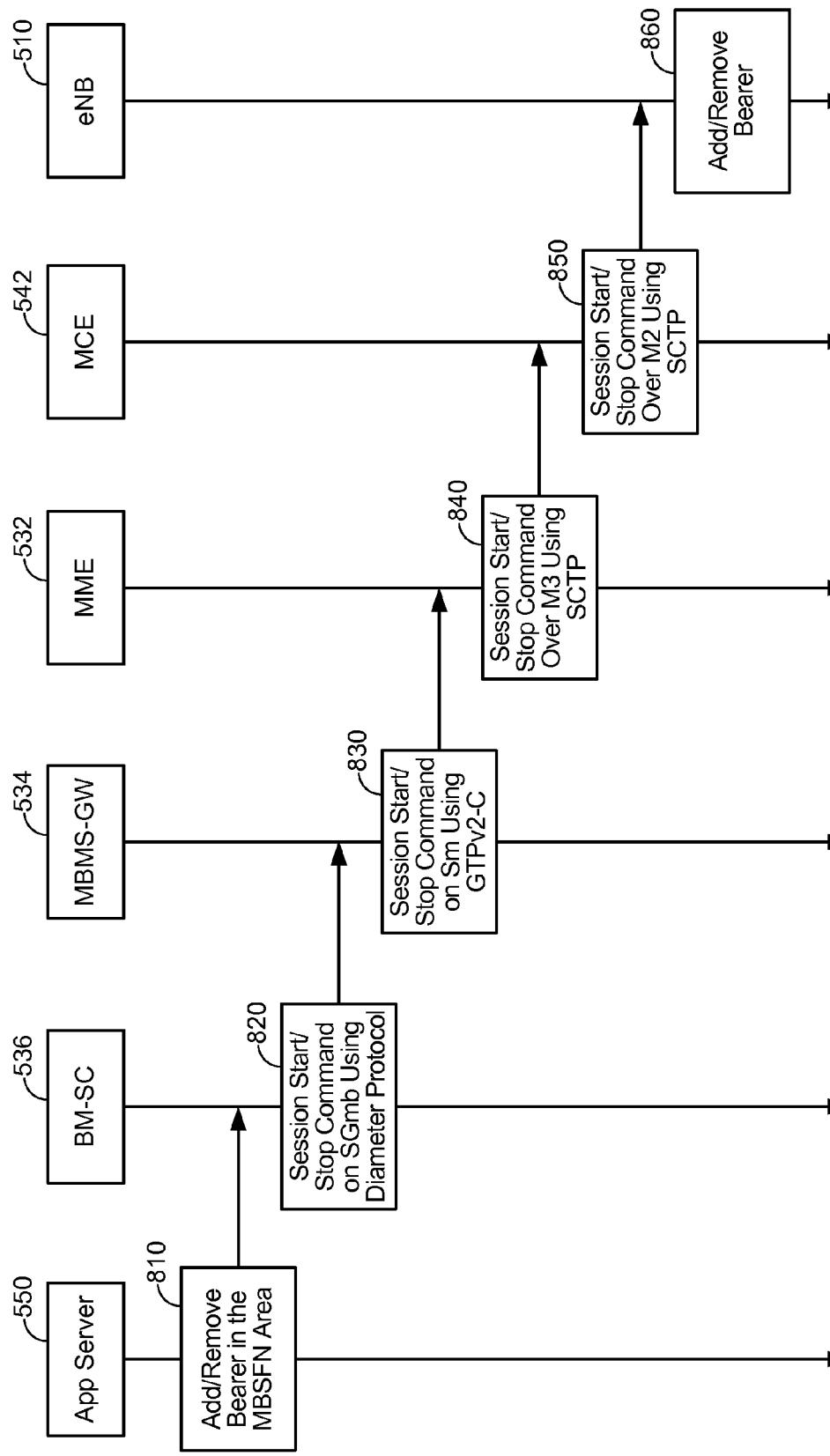
FIG. 8 illustrates an exemplary flow of the setup of a new bearer.

FIG. 8 illustrates an exemplary flow of the setup of a new bearer. Additional bearer management is initiated by the application server, such as application server 550, to the BM-SC, such as BM-SC 536, and propagated to bearer setup at the nNBs, such as eNBs 510, and in the core network. At 810, the application server 550 issues a command to the BM-SC 536 to add or remove a bearer in the MBSFN area, such as MBSFN area 500. At 820, the BM-SC 536 issues a session start or stop command, as appropriate, to the MBMS-GW 534 on the SGmb using the diameter protocol. At 830, the MBMS-GW 534 issues a session start or stop command, as appropriate, to the MME 532 on the Sm using GTPv2-C. At 840, the MME 532 issues a session start or stop command, as appropriate, to the MCE 542 over M3 using stream control transmission protocol (SCTP). At 850, the MCE 542 issues a session start or stop command, as appropriate, to the eNB 510 over the M2 using SCTP. At 860, the eNB 510 adds or removes the bearer, as requested.

Figure 9:
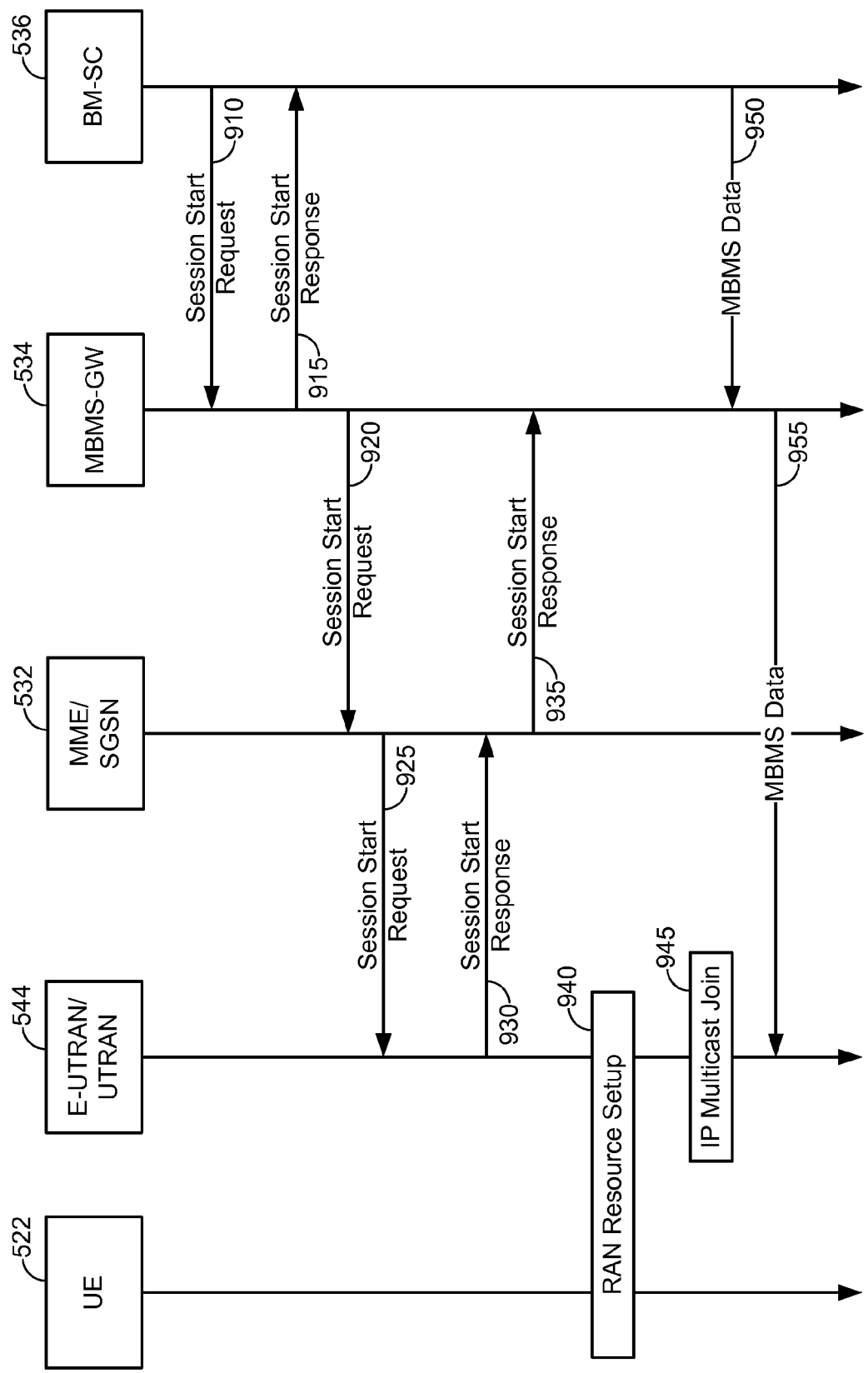
FIG. 9 illustrates an exemplary session start procedure for evolved universal terrestrial radio access network (E-UTRAN) and UTRAN for evolved packet system (EPS).

FIG. 9 illustrates an exemplary session start procedure for evolved universal terrestrial radio access network (E-UTRAN) and UTRAN for evolved packet system (EPS). At 910, the BM-SC 536 sends a session start request to the MBMS-GW 534. At 915, the MBMS-GW 534 sends a session start response to the BM-SC 536. At 920, the MBMS-GW sends a start session request to the MME/SGSN 532. At 925, the MME/SGSN 532 sends a session start request to the E-UTRAN/UTRAN 544. At 930, the E-UTRAN/UTRAN 544 sends a session start response to the MME/SGSN 532. At 935, the MME/SGSN 532 sends a session start response to the MBMS-GW 534. At 940, the E-UTRAN/UTRAN 544 and one or more UEs 522 begin RAN resource setup. At 945, the E-UTRAN/UTRAN 544 performs an IP multicast join. At 950, the BM-SC 536 sends multicast data, such as MBMS data, to the MBMS-GW 534. At 955, the MBMS-GW 534 forwards the multicast/MBMS data to the E-UTRAN/UTRAN 544.

Figure 10:
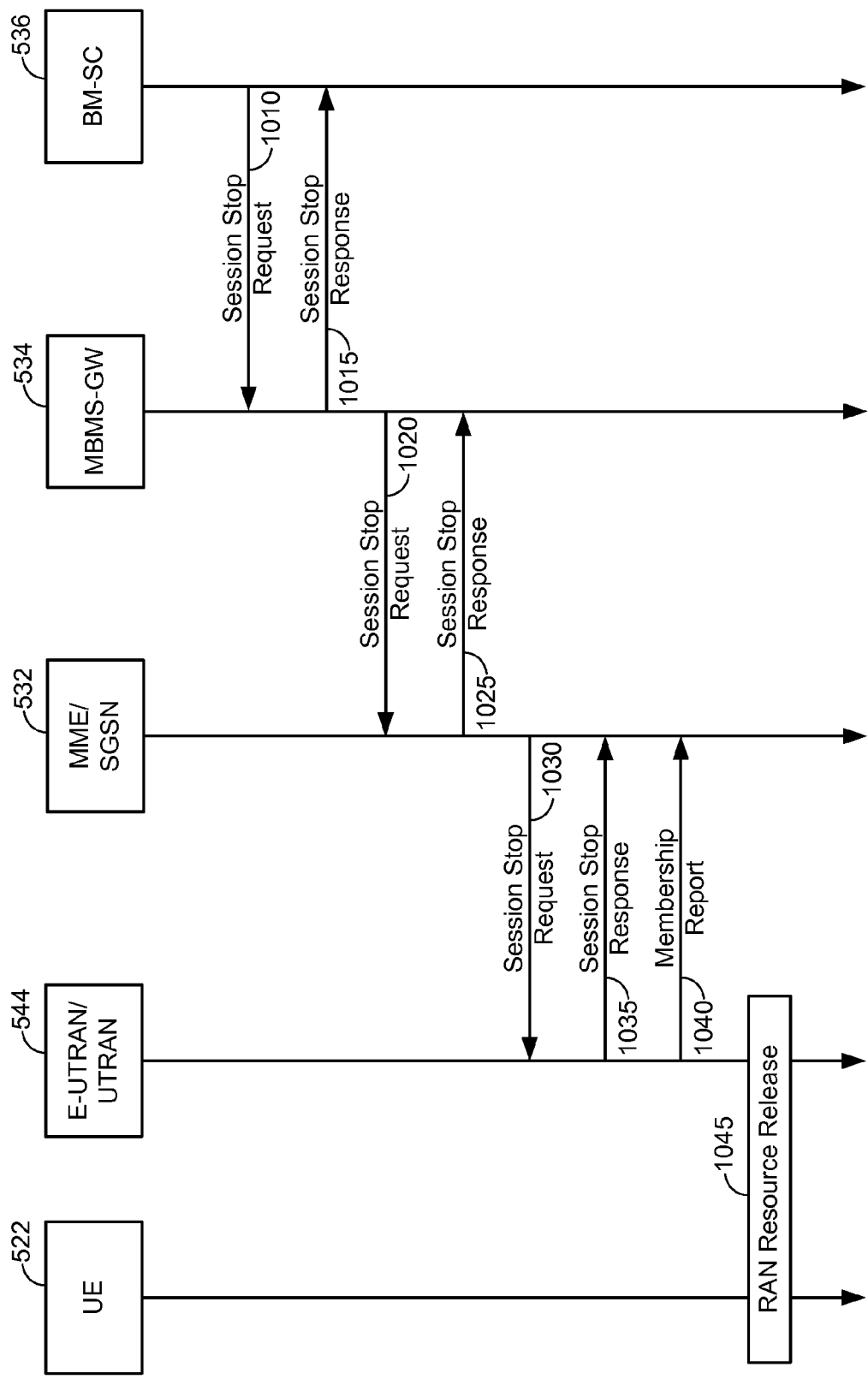
FIG. 10 illustrates an exemplary session stop procedure for E-UTRAN and UTRAN for evolved packet system (EPS).

FIG. 10 illustrates an exemplary session stop procedure for E-UTRAN and UTRAN for EPS. At 1010, the BM-SC 536 sends a session stop request to the MBMS-GW 534. At 1015, the MBMS-GW 534 sends a session stop response to the BM-SC 536. At 1020, the MBMS-GW 534 sends a session stop request to the MME/SGSN 532. At 1025, the MME/SGSN 532 sends a session stop response to the MBMS-GW 534. At 1030, the MME/SGSN 532 sends a session stop request to the E-UTRAN/UTRAN 544. At 1035, the E-UTRAN/UTRAN 544 sends a session stop response to the MME/SGSN 532. At 1040, the E-UTRAN/UTRAN sends an IGMPv3 membership report to the ME/SGSN 532. At 1045, the E-UTRAN/UTRAN 544 and one or more UEs 522 release the RAN resources.

The various embodiments are directed to application server-assisted dynamic multicast bearer management in an MBMS system with semi-static bearer allocation capability for real-time low-latency applications. The various embodiments allocate the minimum number of bearers needed to support the average call rate in a given area, and enable the network to preemptively add bearers to the existing bearer pool by tracking whether the bearers reach a traffic threshold near their capacity, and upon detecting that the bearers reach this threshold, triggering the network to setup another bearer. Thus, the various embodiments establish the bearer before the need arises and allow reasonable time for the UEs to detect the availability of the bearer. Similarly, when the traffic is below a set threshold and there is an unused bearer, the bearer is deactivated.

The various embodiments thus allow low latency applications to meet the call setup latency target while saving over-the-air (OTA) and network capacity wastage by using multicast resources (e.g., new bearers) only when needed. Further, the various embodiments are technology agnostic and provide bearer management control to the application layer.

The various embodiments update the MCCH with the new bearer information. There is generally a delay in propagating MCCH updates. Since the new bearer is activated in anticipation of the data stream, however, the UEs have sufficient time (e.g. at least 10 seconds) to detect the MCCH update and identify the additional bearer.

An MCCH has an MCCH modification period parameter that can be set to either 512 frames (5.12 seconds), or 1024 frames (10.24 seconds). An MCCH change is signaled first through the PDCCH for a full modification period. A multicast radio network temporary identifier (M-RNTI) may be used to signal updates for up to eight MCCHs. MCCH periodicity is half of the smallest MCCH repetition period (a minimum of four frames and a maximum of 128 frames). Modification period starts are such that the SFN (single frequency network) mod of the modification period is equal to 0.

Figure 11:
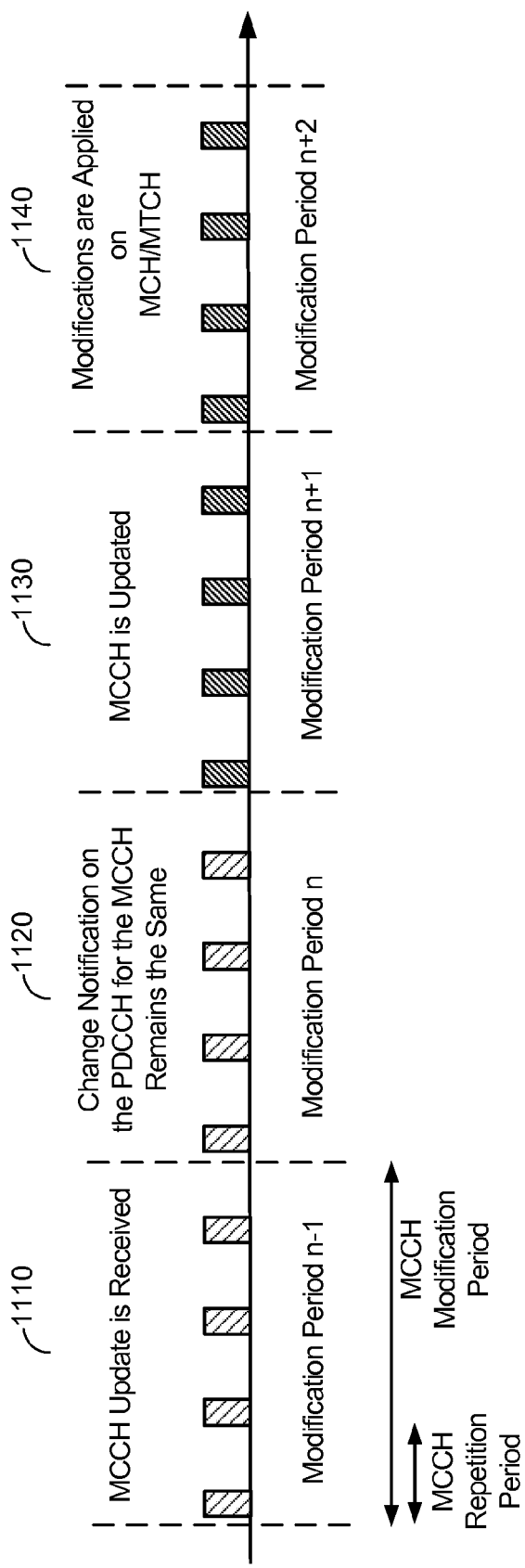
FIG. 11 illustrates an example of an MCCH modification period delay.

FIG. 11 illustrates an example of the MCCH modification period delay. Assuming that there is a configuration change in an MCCH, a request for a configuration change arrives in period n−1 and is implemented in period n+2. Specifically, at 1110, an MCCH update is received during modification period n−1. At 1120, during modification period n, the change notification on the PDCCH for the MCCH remains the same. Then, at 1130, during modification period n+1, the MCCH is updated. Finally, at 1140, during modification period n+2, the modifications are applied on the MCCH and the MTCH. Thus, to modify an eMBMS session, the latency is greater than twice the modification period.

Figure 12:
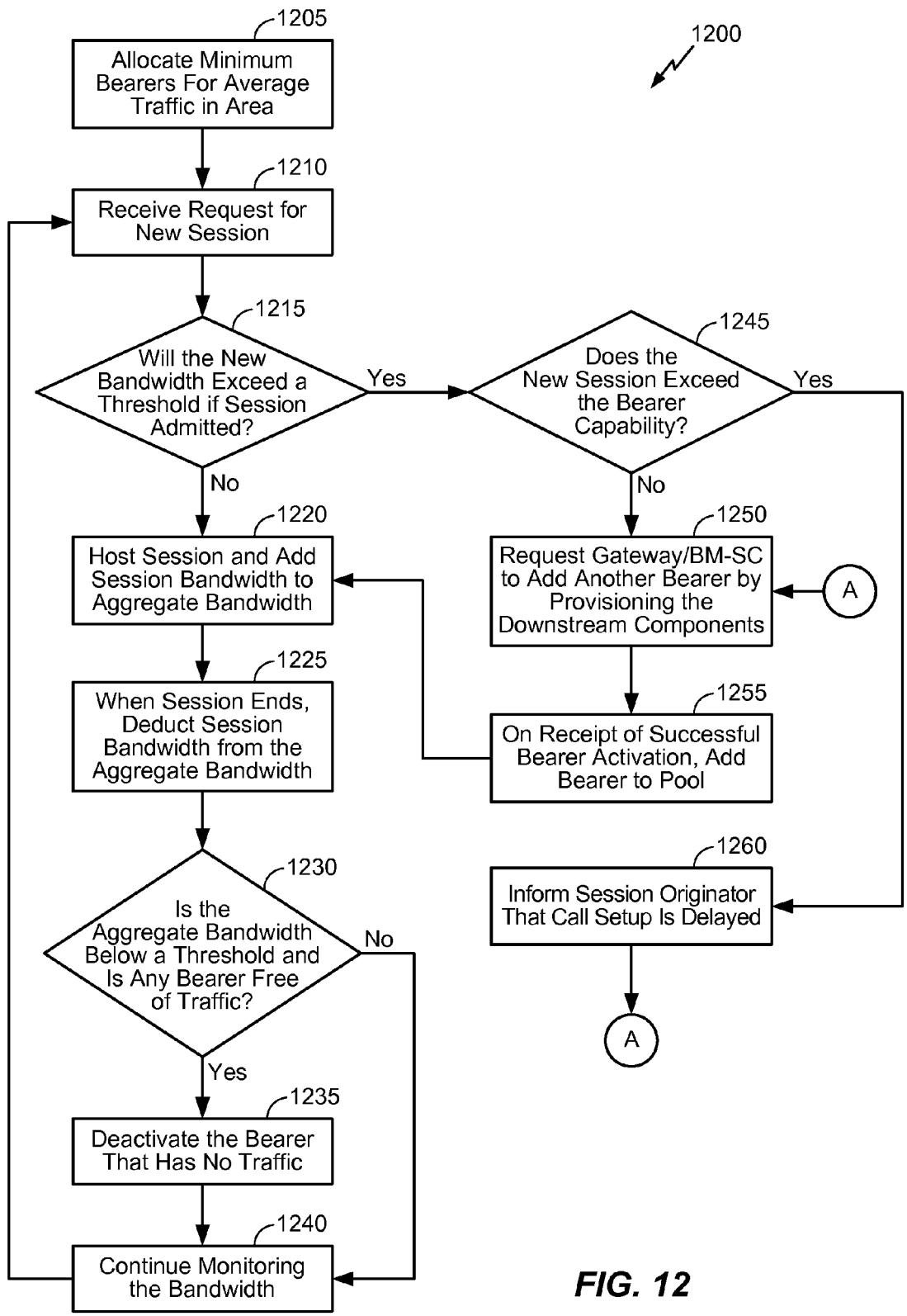
FIG. 12 illustrates a method of managing bearers in an MBMS system according to at least one embodiment of the invention.

FIG. 12 illustrates a method 1200 of managing the bearers in an MBMS system according to an embodiment. At 1205, the application server, such as application server 550, allocates the minimum number of bearers needed to support the average call rate in the MBMS service area, such as MBMS service area 500. At 1210, the application server 550 receives a request for a new session. At 1215, the application server 550 determines, based on the session bandwidth parameters, whether adding the new session to the existing aggregate bandwidth for the current bearers will cause the new aggregate bandwidth to cross a high-capacity threshold when the new session is admitted. The high-capacity threshold should be less than the maximum capacity of the bearers so that the application server 550 has time to setup additional bearers before the MBMS system reaches capacity.

If adding the new session will not exceed the high-capacity threshold, at 1220, the application server 550 proceeds with hosting the session without requesting a new bearer setup and adds the session bandwidth to the existing aggregate bandwidth total for the area. At 1225, when the session ends, the application server 550 deducts the session bandwidth from the existing aggregate bandwidth total for the service area 500. At 1230, the application server 550 determines whether the new aggregate bandwidth total is less than a low-capacity threshold and whether any bearers are free of traffic. The low-capacity threshold should be set at a capacity level where the current network traffic could be handled by the remaining bearers. If the aggregate bandwidth is less than the low-capacity threshold and there is at least one bearer free of traffic, at 1235, the application server 550 deactivates the at least one bearer that has no traffic. At 1240, the application server 550 continues monitoring the aggregate bandwidth for the area, and may return to 1210 when a request for a new session is received.

If at 1230, however, the application server 550 determines that the aggregate bandwidth is not less than the low-capacity threshold and/or there is not at least one bearer free of traffic, then at 1240, the application server 550 continues monitoring the aggregate bandwidth for the MBMS area 500.

If at 1215, the application server 550 determines that adding the new session will exceed the high-capacity threshold, then at 1245, the application server 550 determines whether the new session will exceed the bearer's capability. If at 1245 the application server 550 determines that the new session will not exceed the bearer's capability, then at 1250, the application server 550 requests the network gateway/BM-SC, such as BM-SC 536, to add another bearer by provisioning the downstream network components. At 1255, upon receipt of a successful bearer activation response from the network gateway/BM-SC 536, the application server 550 adds the new bearer to the pool of bearers used for determining session admission. The method then proceeds to 1220.

If at 1245 the application server 550 determines that the new session will exceed the bearer's capability, then at 1260, the application server 550 informs the session originator, such as UE 520, that the session will be delayed. The method then proceeds to 1250.

When adding a new session to a bearer at 1220, the application server 550 first attempts to add the session to one of the default bearers allocated in 1205, regardless of whether a new bearer was activated in response to the new session being requested. If none have the necessary capacity, the application server 550 adds the session to a newly activated bearer instead. Since the application server 550 adds new sessions to the default bearers allocated in 1205 first and up to their capacity, any additional bearers added to the pool in 1255 will empty first, and thus be deactivated in 1235. That is, the network traffic is not distributed over all activated bearers, but rather concentrated on the default bearers, allowing for the deactivation of any extra bearers in 1235.

Figure 13:
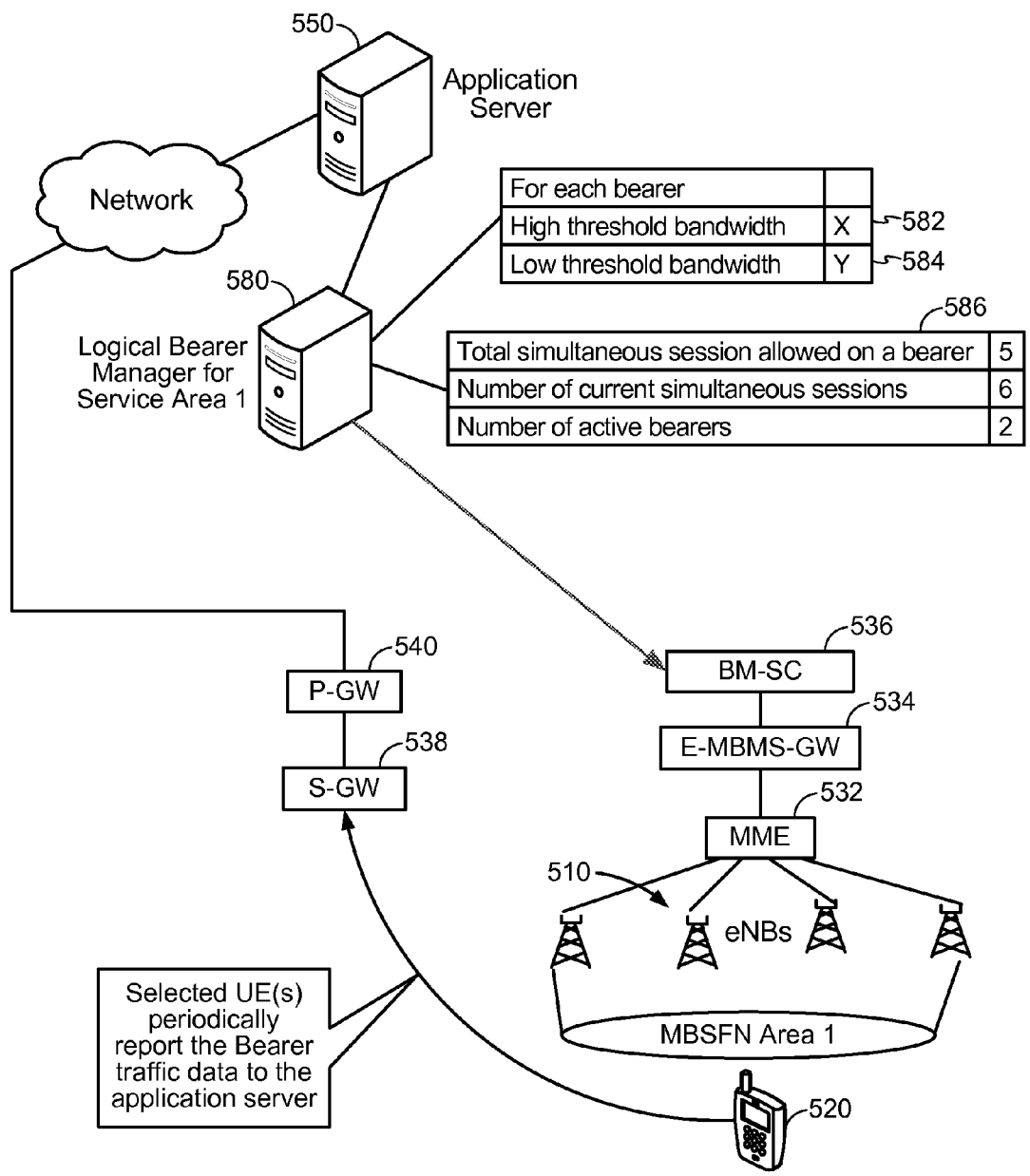
FIG. 13 illustrates a system block diagram according to at least one embodiment of the invention.

FIG. 13 illustrates a block diagram of an exemplary eMBMS system according to an embodiment. The application server 550 is provisioned with a high-capacity threshold 582 and a low-capacity threshold 584 for the bandwidth for each bearer. The application server 550 can also be provisioned with a table 586 that stores the total simultaneous sessions allowed on a bearer, the number of current simultaneous sessions, and the number of active bearers. In the example of FIG. 13, the high capacity threshold 582, low capacity threshold 584, and table 586 are shown as stored on a logical bearer manager 580 for MBSFN service area 1. The logical bearer manager 580 may be part of the application server 550, or a separate entity accessed by the application server 550.

Table 586 shows that there are a total of five simultaneous sessions allowed on a bearer, that there are six current simultaneous sessions, and that there are two active bearers. It will be apparent that the values stored in table 586 are examples, and the disclosure is not limited to these values. When the bandwidth usage for a session exceeds the high-capacity threshold 582, the application server 550 sends a new bearer activation message requesting that an additional bearer be setup, as described above with reference to FIG. 12. On session termination, when the low-capacity threshold 584 is reached and a bearer is empty, the bearer is deactivated, as also described above with reference to FIG. 12.

The system identifies certain UEs for periodic reporting of multicast channel activity, such as UE 520. The UE 520 monitors the multicast channel (for eMBMS, UE 520 would monitor the MCCH and the MCH) and can use a unicast channel to report the current number of media streams for each multicast bearer. From these periodic reports, the application server 550 can determine the need to preemptively establish an additional bearer or deactivate an unused bearer by comparing the network traffic to the high threshold and/or the low threshold, as discussed above with reference to FIG. 12.

Referring to 1215 of FIG. 12, the application server 550 may use thresholds 582 and 584, table 586, and/or the periodic reports from the selected UEs to determine whether adding the new session to the existing aggregate bandwidth for the current bearers will cause the new aggregate bandwidth to cross the high-capacity threshold 582 when the new session is admitted. Likewise, application server 550 may use thresholds 582 and 584, table 586, and/or the periodic reports from the selected UEs to make the determinations in 1230 and 1245 of FIG. 12.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for group communications over evolved multimedia broadcast/multicast services (eMBMS). Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for preemptively establishing a multicast bearer, comprising:
   determining whether adding a multicast session to a plurality of multicast bearers will exceed a high bandwidth threshold;
   requesting, based on determining that adding the multicast session will exceed the high bandwidth threshold, setup of a new multicast bearer;
   hosting the multicast session on an available one of the plurality of multicast bearers or the new multicast bearer;
   deducting, based on the multicast session ending, a bandwidth of the multicast session from an aggregate bandwidth of a pool of multicast bearers comprising the plurality of multicast bearers and the new multicast bearer;
   determining whether the aggregate bandwidth falls below a low bandwidth threshold; and
   deactivating, based on determining that the aggregate bandwidth falls below the low bandwidth threshold, one of the plurality of multicast bearers or the new multicast bearer.

2. The method of claim 1, further comprising:
adding the multicast session to a multicast bearer that already has one or more multicast sessions established.

3. The method of claim 2, further comprising:
when one of the one or more multicast sessions ends, deducting a bandwidth of the one of the one or more multicast sessions from the aggregate bandwidth of the pool of multicast bearers;
determining whether the aggregate bandwidth falls below the low bandwidth threshold; and
based on determining that the aggregate bandwidth falls below the low bandwidth threshold, deactivating one of the plurality of multicast bearers or the new multicast bearer.

4. The method of claim 1, wherein the plurality of multicast bearers comprise a minimum number of multicast bearers needed to support an average call rate in a multimedia broadcast multicast service (MBMS) service area.

5. The method of claim 1, further comprising:
receiving a request to add the multicast session; and
in response to the receiving, performing the determining.

6. The method of claim 1, further comprising:
determining whether adding the multicast session will exceed bearer capability; and
based on determining that adding the multicast session will exceed the bearer capability, sending a notification to an originator of the multicast session that setup of the multicast session is delayed.

7. The method of claim 1, further comprising:
determining whether adding the multicast session will exceed bearer capability; and
based on determining that adding the multicast session will not exceed the bearer capability, requesting the setup of the new multicast bearer.

8. The method of claim 1, further comprising:
in response to activation of the new multicast bearer, adding the new multicast bearer to a pool of multicast bearers comprising the plurality of multicast bearers.

9. The method of claim 8, further comprising:
adding the bandwidth of the multicast session to the aggregate bandwidth of the pool of multicast bearers.

10. The method of claim 1, further comprising:
receiving periodic reports from selected user devices, the periodic reports including an indication of an amount of traffic on the plurality of multicast bearers and the new multicast bearer.

11. The method of claim 10, further comprising:
determining that the multicast session has ended based on the periodic reports.

12. The method of claim 1, wherein the determining whether the aggregate bandwidth falls below the low bandwidth threshold further comprises:
determining whether one of the plurality of multicast bearers or the new multicast bearer is free of traffic; and
based on determining that one of the plurality of multicast bearers or the new multicast bearer is free of traffic, deactivating the one of the plurality of multicast bearers or the new multicast bearer.

13. An apparatus for preemptively establishing a multicast bearer, comprising:
logic configured to determine whether adding a multicast session to a plurality of multicast bearers will exceed a high bandwidth threshold;
logic configured to request setup of a new multicast bearer based on a determination that adding the multicast session will exceed the high bandwidth threshold;
logic configured to host the multicast session on an available one of the plurality of multicast bearers or the new multicast bearer;
logic configured to deduct, based on the multicast session ending, a bandwidth of the multicast session from an aggregate bandwidth of a pool of multicast bearers comprising the plurality of multicast bearers and the new multicast bearer;
logic configured to determine whether the aggregate bandwidth falls below a low bandwidth threshold; and
logic configured to deactivate, based on a determination that the aggregate bandwidth falls below the low bandwidth threshold, one of the plurality of multicast bearers or the new multicast bearer.

14. The apparatus of claim 13, further comprising:
logic configured to add the multicast session to a multicast bearer that already has one or more multicast sessions established.

15. The apparatus of claim 14, further comprising:
logic configured to deduct, when one of the one or more multicast sessions ends, a bandwidth of the one of the one or more multicast sessions from the aggregate bandwidth of the pool of multicast bearers;
logic configured to determine whether the aggregate bandwidth falls below the low bandwidth threshold; and
logic configured to deactivate one of the plurality of multicast bearers or the new multicast bearer based on a determination that the aggregate bandwidth falls below the low bandwidth threshold.

16. The apparatus of claim 13, wherein the plurality of multicast bearers comprise a minimum number of multicast bearers needed to support an average call rate in a multimedia broadcast multicast service (MBMS) service area.

17. The apparatus of claim 13, further comprising:
logic configured to receive a request to add the multicast session; and
logic configured to determine whether the aggregate bandwidth falls below the low bandwidth threshold in response to reception of the request to add the multicast session.

18. The apparatus of claim 13, further comprising:
logic configured to determine whether adding the multicast session will exceed bearer capability; and
logic configured to send a notification to an originator of the multicast session that setup of the multicast session is delayed based on a determination that adding the multicast session will exceed the bearer capability.

19. The apparatus of claim 13, further comprising:
logic configured to determine whether adding the multicast session will exceed bearer capability; and
logic configured to request the setup of the new multicast bearer based on a determination that adding the multicast session will not exceed the bearer capability.

20. The apparatus of claim 13, further comprising:
logic configured to add the new multicast bearer to a pool of multicast bearers comprising the plurality of multicast bearers in response to activation of the new multicast bearer.

21. The apparatus of claim 20, further comprising:
logic configured to add the bandwidth of the multicast session to the aggregate bandwidth of the pool of multicast bearers.

22. The apparatus of claim 13, further comprising:
logic configured to receive periodic reports from selected user devices, the periodic reports including an indication of an amount of traffic on the plurality of multicast bearers and the new multicast bearer.

23. The apparatus of claim 22, further comprising:
logic configured to determine that the multicast session has ended based on the periodic reports.

24. The apparatus of claim 13, wherein the logic configured to determine whether the aggregate bandwidth falls below the low bandwidth threshold further comprises:
logic configured to determine whether one of the plurality of multicast bearers or the new multicast bearer is free of traffic; and
logic configured to deactivate the one of the plurality of multicast bearers or the new multicast bearer based on a determination that one of the plurality of multicast bearers or the new multicast bearer is free of traffic.

25. An apparatus for preemptively establishing a multicast bearer, comprising:
means for determining whether adding a multicast session to a plurality of multicast bearers will exceed a high bandwidth threshold;
means for requesting setup of a new multicast bearer based on a determination that adding the multicast session will exceed the high bandwidth threshold;
means for hosting the multicast session on an available one of the plurality of multicast bearers or the new multicast bearer;
means for deducting, based on the multicast session ending, a bandwidth of the multicast session from an aggregate bandwidth of a pool of multicast bearers comprising the plurality of multicast bearers and the new multicast bearer;
means for determining whether the aggregate bandwidth falls below a low bandwidth threshold; and
means for deactivating, based on a determination that the aggregate bandwidth falls below the low bandwidth threshold, one of the plurality of multicast bearers or the new multicast bearer.

26. A non-transitory computer-readable medium for preemptively establishing a multicast bearer, the non-transitory computer-readable medium containing instructions that, when executed by a computer, cause the computer to perform operations, the instructions comprising:
at least one instruction to cause the computer to determine whether adding a multicast session to a plurality of multicast bearers will exceed a high bandwidth threshold;
at least one instruction to cause the computer to request setup of a new multicast bearer based on a determination that adding the multicast session will exceed the high bandwidth threshold;
at least one instruction to cause the computer to host the multicast session on an available one of the plurality of multicast bearers or the new multicast bearer;
at least one instruction to cause the computer to deduct, based on the multicast session ending, a bandwidth of the multicast session from an aggregate bandwidth of a pool of multicast bearers comprising the plurality of multicast bearers and the new multicast bearer;
at least one instruction to cause the computer to determine whether the aggregate bandwidth falls below a low bandwidth threshold; and
at least one instruction to cause the computer to deactivate, based on a determination that the aggregate bandwidth falls below the low bandwidth threshold, one of the plurality of multicast bearers or the new multicast bearer.

* * * * *